United States Patent [19]

White, Jr. et al.

[11] Patent Number: 6,005,230

[45] Date of Patent: Dec. 21, 1999

[54] RADIANT HEATER FOR ANALYTICAL LABORATORY USE WITH PRECISION ENERGY CONTROL, NON CONTAMINATION EXTERIOR AND UNIFORM RADIATION FOOTPRINT

[76] Inventors: R. Thomas White, Jr., 4540 Chebar Dr., Pfafftown, N.C. 27040; Henry H. Morton, 100 Covington St., Wadesboro, N.C. 28170-2716

[21] Appl. No.: 09/161,858

[22] Filed: Sep. 28, 1998

[51] Int. Cl.⁶ .................................................. H05B 1/02
[52] U.S. Cl. ............................................................ 219/492
[58] Field of Search .................................. 219/501, 497, 219/505, 506, 494, 492, 411–413; 377/102, 120, 121, 101; 392/416

[56] References Cited

U.S. PATENT DOCUMENTS

| | | | |
|---|---|---|---|
| 4,570,054 | 2/1986 | Chidzey et al. | 219/501 |
| 5,118,200 | 6/1992 | Kirillov et al. | 374/120 |
| 5,332,557 | 7/1994 | Sahoda et al. | 392/416 |
| 5,672,289 | 9/1997 | O'Neill | 219/505 |
| 5,900,177 | 5/1999 | Lecouras et al. | 219/497 |

*Primary Examiner*—Mark Paschall

[57] ABSTRACT

A non-contaminating radiant heater for analytical laboratory use with a controller providing a closed-loop, precise regulation of sequencing patterns of energy emission delivered to a sample at a programmed rate preventing hotspots until a preselected temperature is reached for a preselected time interval all. within a programmed schedule. The radiant heater includes a supporting base functioning as a sample platform, a vertical support member secured to the base and sample platform, and an electrically powered radiant heating element is enclosed by a sealed surrounding and supporting fixture fastened to the vertical supporting member providing a uniform radiation footprint.

5 Claims, 9 Drawing Sheets

RADIANT HEATER FOR ANALYTICAL LABORATORY USE WITH PRECISION ENERGY CONTROL, NON CONTAMINATION EXTERIOR AND UNIFORM RADIATION FOOTPRINT

BACKGROUND OF THE INVENTION

1. Field of the Invention.

The present invention relates to an electrically powered radiant heater for analytical laboratory use and, more particularly, to a radiant heater for analytical laboratory use having a controller for receiving input power from the power source and processing output power to the heating means to deliver heat to a sample being heated at a programmed rate until a preselected temperature is reached for a preselected time interval all within a programmed schedule.

2. Description of the Prior Art.

There is a constant need for clean radiant heat in both research and development facilities, as well as in process applications in the medical, pharmaceutical, electronic, and semi-conductor, defense/aerospace, food processing, painting, coating, restaurant, automotive and petroleum fields. For example, automobile glass companies that produce nonfogging glass have manufacturing areas with a clean environment. The processes involved in the production of medicine and the like which require drying the final product during the production process require clean heat. The electronic industry needs a clean heat environment for the production of semi-conductors for the computer industry. The application of polymer coatings to circuit boards requires a total absence of contaminating dust or metal. In the coating industry, coatings such as Teflon® and ceramic are applied to product services in clean environments and often dried for long periods of time during which a clean source of heat is desirable.

At the present, most frequently used radiant laboratory heaters are infrared heating lamps of either 250 watts or 375 watts. The 375 watt infrared lamp achieves a temperature of approximately 105° Centigrade with a sample positioned about two inches from the lamp. The temperature is about 222° Centigrade at the lamp's surface which is not a usable location.

Current infrared heating systems constructed of exposed metal parts can produce a source of contamination to laboratory samples. Contamination is extremely damaging in the analytical laboratory involved in providing accurate trace element determinations. The metal socket receptacle on all infrared heating lamps will eventually corrode when exposed to acid vapors. Since the infrared lamp is not sealed inside a protective housing, the corroded metallic parts from the lamp socket fall in a random manner directly into the analytical sample positioned below which is later subjected to analysis to determine the trace elements present. Thus, the metallic socket particles become combined with the trace elements from the sample contents to yield inaccurate information.

Heat controls on infrared heating lamps range from a plug (full heat) to a variable adjustment knob. These systems are difficult, if not impossible, to use efficiently to provide consistent and reproducible levels of heat such as required in a laboratory environment. Heating conditions that cannot be consistently and reliably reproduced restrict or impede the analyst in the development of precise methodology for sample preparation.

Thus, there is a need for a general purpose laboratory radiant heater having higher heating potential, precise and reproducible heating parameter settings, and greater functional integrity so as not to contaminate samples being treated. It is to this need that the present invention is directed.

SUMMARY OF THE INVENTION

The present invention is a radiant heater for analytical laboratory use, particularly useful in preserving the integrity of sample ingredients, which includes a supporting base functioning as a sample platform to which is secured a vertical supporting member. A heater support fixture is connected to the vertical member and includes one or more heating elements. A power source operates a controller for the heating element, the controller receiving input power from the power source and processing output power to the heater means to deliver heat to the sample at a programmed rate until a preselected temperature is reached for a preselected time interval within a programmed schedule. The controller includes a keypad/display element for entering date; a signal receiving and transmitting means, such as a central processing unit ("CPU"), a profile generator responsive to the signal receiving and transmitting means, phase angle drivers for receiving signals from the profile generator and converting them to timing pulses, power switching means operable to selectively deliver increments of power to the heating elements, and an energy sensor operable with the profile generator for determining the energy output of the heating elements and enabling the profile generator to compensate for variations in input power and heating element efficiency.

The controller regulates the power going to the heating elements to sequence the power to the elements in a controlled pattern or "wave" so that no element is on continuously. Heat energy will therefor be evenly distributed over the broad footprint of the sample with no area of the sample being at a focal point that would receive a disproportion amount of energy. The controller will also sequence the heating elements with soft start and soft stop smooth, linear changes in power to minimize the thermal shock, enhance the wave appearance discussed previously and reduce hot spots in the sample.

Thus, there has been outlined the more important features of the invention in order that the description that follows may be better understood and in order that the present contribution to the art may be better appreciated. There are, of course, additional features of the present invention that will be described hereinafter and which will form the subject matter of the claims appended hereto. In this respect, before explaining at least one embodiment of the invention in detail, it is to be understood that the invention is not limited in this application to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objects of the invention previously set forth, along with the various features of novelty which characterize the invention, are noted with particularity in the claims annexed to and forming a part of this disclosure. For a better understanding of the invention, its operating advantages and the specific results obtained by its use, reference should be made to the following detail specification taken in conjunction with the accompanying drawings wherein like characters of reference designate like parts throughout the several views.

DETAILED DESCRIPTION OF PREFERRED EMBODIMENT

Figure 1:
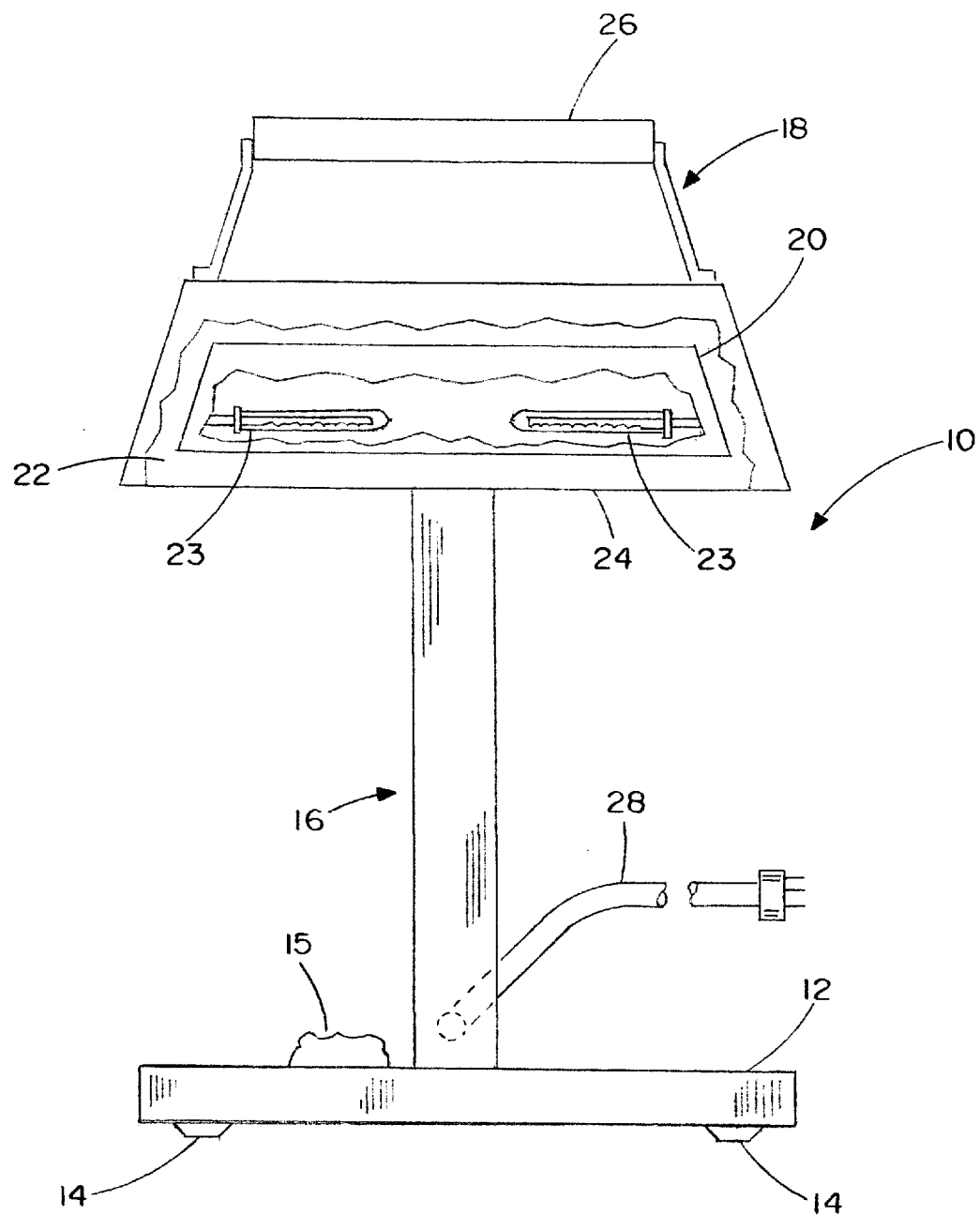
FIG. 1 is a front elevational view of the radiant heater comprising a primary part of the present invention.

Referring now to the drawings and particularly to FIG. 1, a radiant heater shown generally as 10 is formed of a base 12 supported by feet 14 formed of a thermally insulating non slip material to raise base 12 and carried structure above the surface should a spill occur. Base 12 also functions to support a sample 15 to be analyzed. A vertical supporting member shown generally as 16 is mounted on base 12 and supports a heater support fixture shown generally as 18. Fixture 18 houses a reflector 20 within a chemical resistant coated metal totally sealed heater enclosure 22 as shown. A plurality of electrically powered heating elements 23, a convenient number being 4, is carried within enclosure 22 near clear glass fresnel lens 24 so that there is no obstruction of heat or light between heating elements 23 and sample 15. A thermally insulated handle 26 provides a convenient mechanism for moving the heater from place to place. Appropriate conductors 28 connect heating elements 23 to the power source and controller subsequently to be described.

Figure 2:
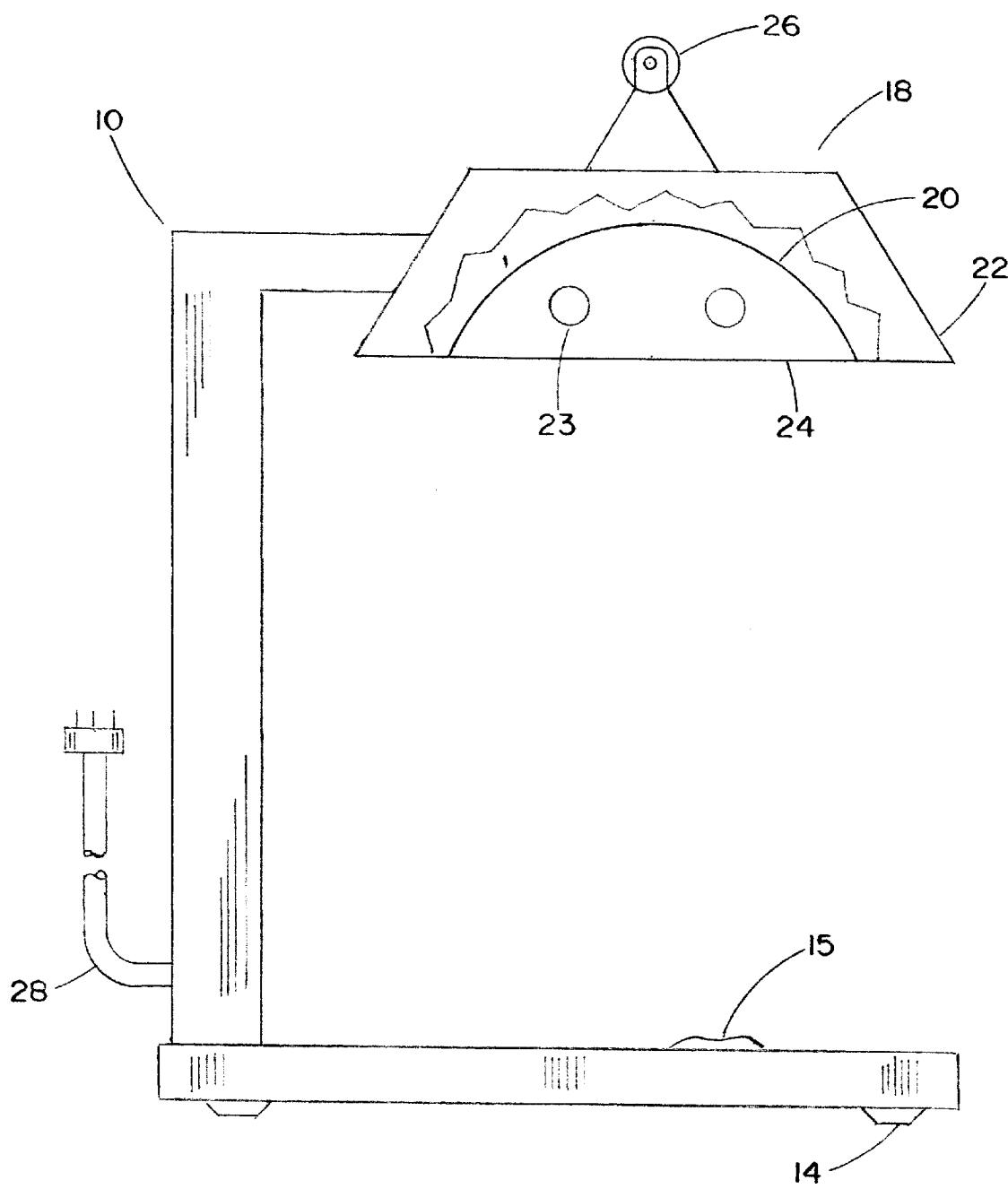
FIG. 2 is a side elevational view of the radiant heater shown in FIG. 1.
Figure 3:
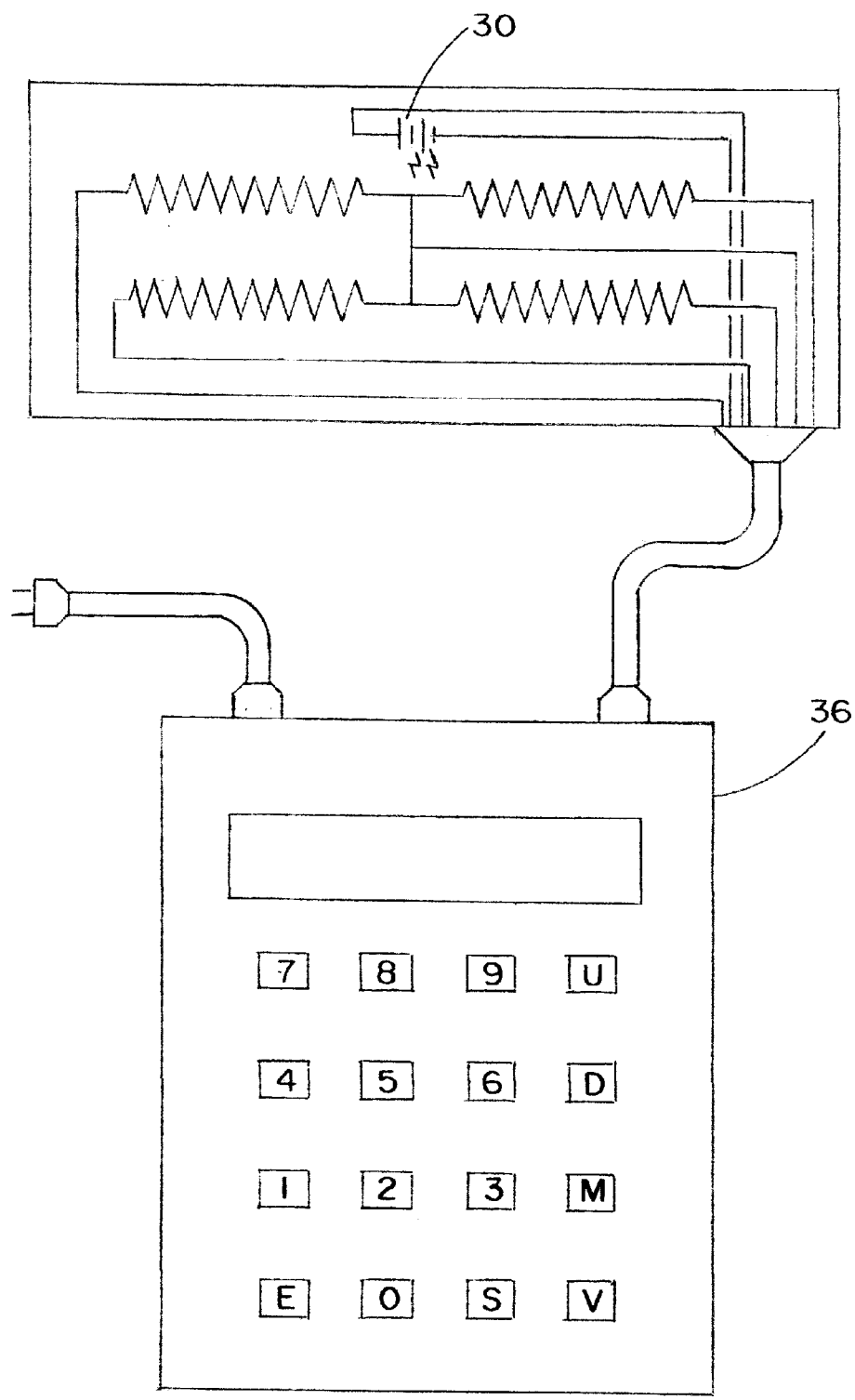
FIG. 3 is a schematic isolated view of the radiant heater and the controller comprising the present invention.

In FIG. 2, the accurate shape of reflector 20 is clearly illustrated with heating elements 23 being symmetrically positioned within the reflector's interior configuration.

Radiant heater 10 of the present invention may be any convenient radiant heating means including a halogen lamp or other equally acceptable components. The metallic portion of heater 10 is preferably coated with non-corrosive, noncontaminated materials such a Teflon®, ceramic, plastic or epoxy that prevents any contamination development that will damage the analytical sample and thus result in inaccurate findings. Any lamp that is used will have non-contaminating ceramic lamp receptacles to hold the lamp totally within enclosure 22. All components or radiant heater 10 are appropriately treated to provide an uncontaminated and moisture proof covering to provide a safe working environment for laboratory personnel as well as to avoid sample contamination.

Filament heating elements 23, particularly lights such as halogen bulbs, are stressed by the sudden thermal shock of "turn-on" to full power or "turn-off" to zero power. The stress shortens the life of elements 23, consequently the present invention is designed to sequence the bulbs or elements 23 with "soft-start" and "soft-stop" smooth, linear changes in power to minimize the thermal shock. Moreover, the power going to heating elements 23 will sequence power to the bulbs or elements 23 in a controller pattern or "wave" so that no bulb or element 23 is on continuously. This "wave" appearance in enhanced by the "soft-start" and "soft-stop" linear changes in power.

The power application previously described insures that no area of sample 15 will be at a focal point that would receive a disproportionate amount of heat energy. This is very important in some heating applications particularly if the energy level is set high for quick heating.

Four (4) programmable features of the present design combine to form a heating element of precise operation and control. First, temperature control of the sample is achieved by including an energy sensor 30 within heater enclosure 22 to control the application or non-application of heat as necessary to sample 15 so that it remains at the desired temperature.

Secondly, the energy index is a measure of rate of heat energy delivery to the sample and can be controlled, for example, by the application of a large quantity of heat energy over a short period of time or a small amount of energy over a longer time. While both approaches accomplish the same objective and deliver the same total amount of heat to sample 15, the high energy/short time approach results in a greater temperature differential between the surface and bottom of sample 15 during the process. To minimize the scorching or other degrading results that might occur, control of the rate of energy is a significant benefit.

Thirdly, profiling allows the energy index and sample temperature to be changed over time in a complex profile to accomplish automatically a series of objectives somewhat like following a recipe for cooking a delicate dish. It allows the accomplishment of a series of objectives automatically over a long period of time under very precise parameters.

Lastly, scheduling programmability is a feature that enables the operator to establish a timetable for the heating processes to being and end as well as to control external devices or systems such as fans, vibrators, shakers, stirrers or ventilation systems. Thus an entire program involving testing samples and combining the test procedures with other related procedures can be accomplished at the same time.

Figure 4:
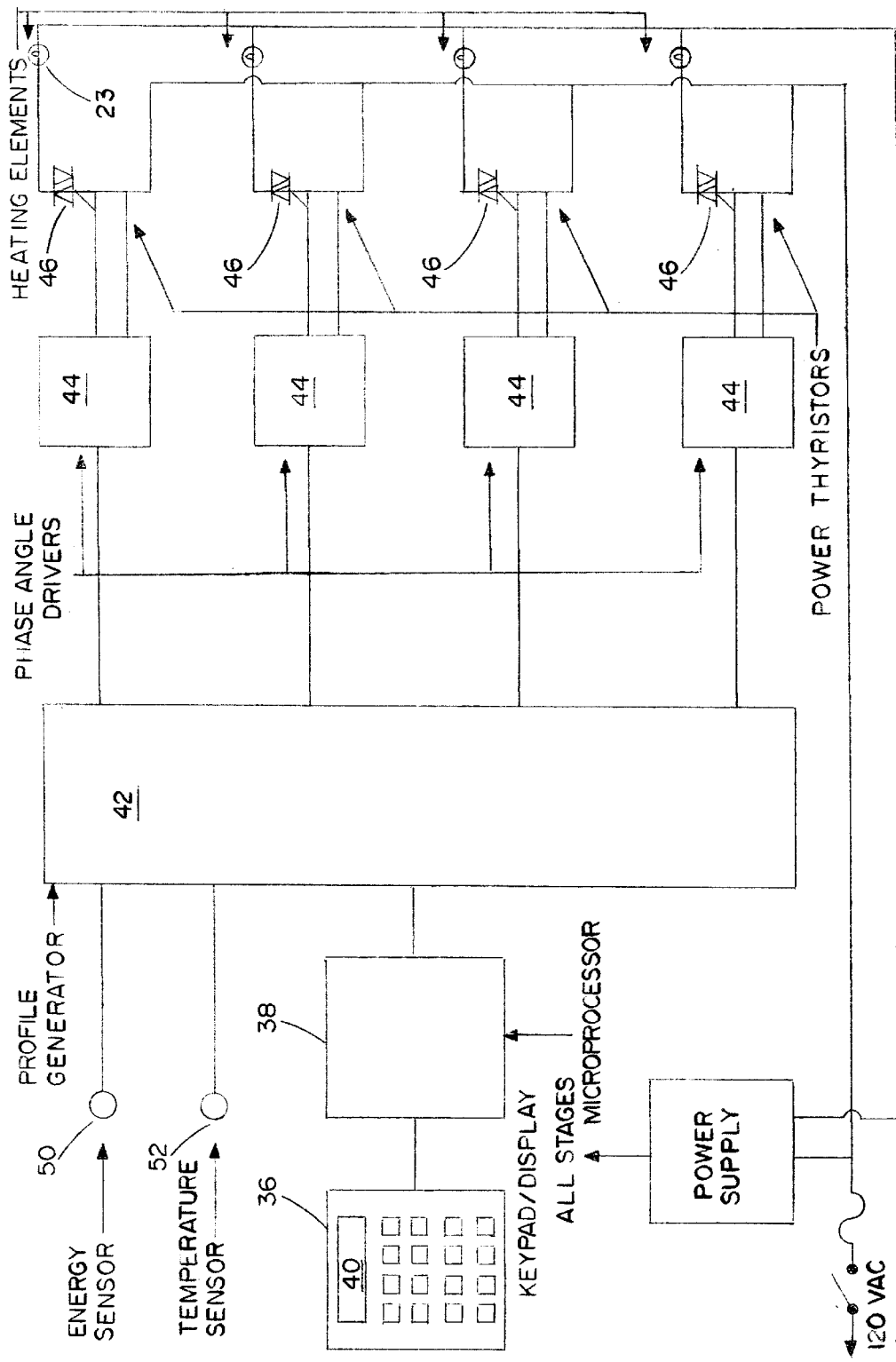
FIG. 4 is a block diagram of the controller comprising a part of the present invention.

Referring now to FIG. 4, a keypad/display element 36 provides the operator with an interface to the system. The desired energy index, temperature and timing are entered into the signal receiving and transmitting means, herein shown as CPU 38, from keypad/display element 36 and is confirmed or reviewed on the display 40.

CPU 38 is the computer that stores the program and executes the desired functions. It receives the programming from element 36 and shows what it has received on display 40. When a control function is called for, CPU 38 sends the proper signals to profile generator 42.

Profile generator 42 decodes the commands from CPU 38 and turns them into time-sequenced energy level references for each of the four phase angle drivers 44. The amplitude and timing of these energy references are responsible for the elimination of "hot spots" in the sample by "time sharing" the location of the energy emission point.

Phase angle drivers 44 accept energy level references from profile generator 42 and convert them to timing pulses which are delivered to the gate of each of the four power thyristors 46. Power thyristors 46 function as switches which are turned on by pulses from profile generator 42. When a thyristor 46 is turned on, it conducts power for the balance of the present half cycle of the alternating current waveform. If the pulse is received early in the half cycle, then a large portion of the available power will be delivered to the heating element 23 it drives. Conversely, if the pulse arrives late in the half cycle, then a small amount of the power is delivered. Thus the timing of the pulses determines the heat energy output. An opportunity for profile generator 42 to adjust that output occurs every 120 t of a second (each half cycle of the 60 Hz input power waveform).

Energy sensor 30 is a heat radiation transducer that senses the real time output of heating elements 23 so that profile generator 42 can compensate for variations in the incoming line voltage and heating element efficiency.

Temperature sensor 52 is a probe that can be immersed in sample 15 being heated to give feedback to profile generator 42 as to the actual temperature of the sample. Thus the temperature can be controlled by closed-loop regulation.

Figure 5:
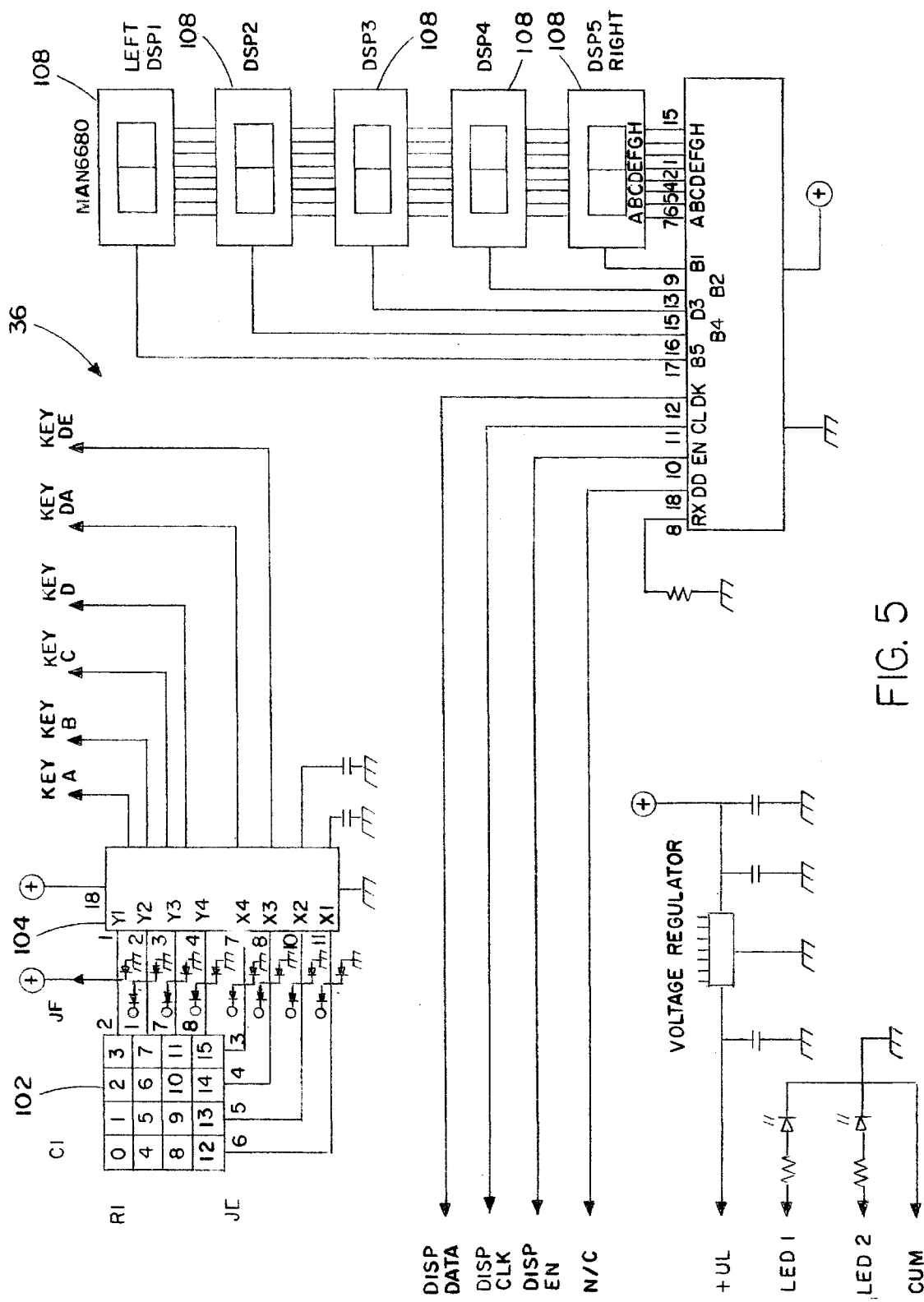
FIG. 5 is a schematic diagram of the keypad/display component of the controller of the present invention.

A schematic diagram of the keypad/display 36 is shown in FIG. 5. A membrane-type keypad matrix switch 102 drives the keypad encoder 104 which converts the depressed key into binary-coded-decimal data that is passed onto CPU 38 in FIG. 6. CPU 38 encodes the data for display into a serial bit stream that is passed on to the display decoder 106 in FIG. 5. This decoder powers the seven segment LED displays 108 to form the appropriate numbers for viewing of the operator.

Figure 6:
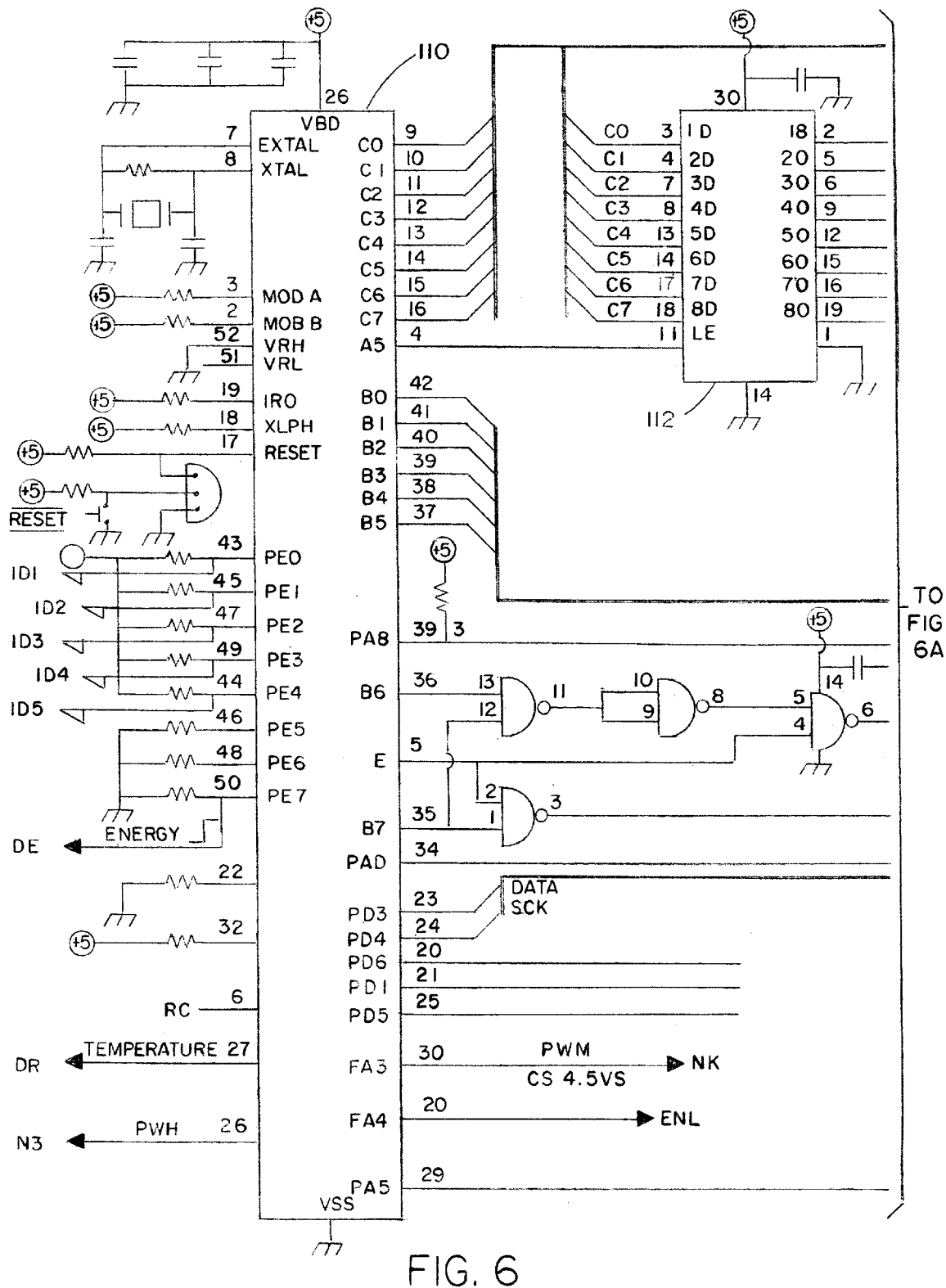
FIG. 6 is a schematic circuit diagram of the signal receiving and transmitting apparatus associated with the controller which forms a part of the present invention.
Figure 6A:
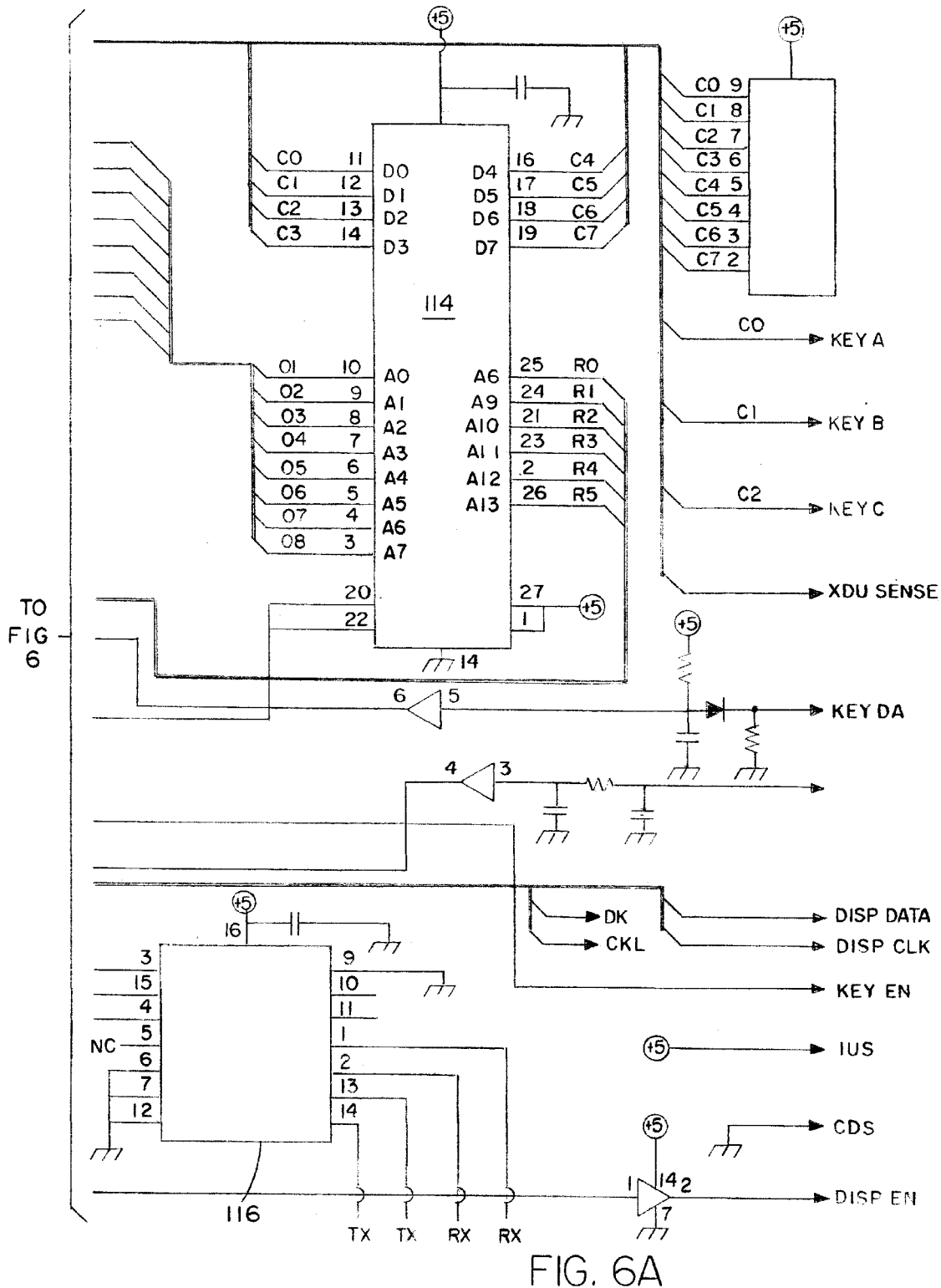

FIG. 6 is a schematic circuit diagram of CPU 38 forming the signal receiving and transmitting means of the present invention which is of conventional design. A microprocessor 110 such as a Motorola 68 HC11 microprocessor along with necessary data latch 112 and EPROM 114 (erasable programmable read-only memory) form CPU 38. Data from the keypad encoder 104 and data to the display decoder 106 establish tactile and visual communication between the operator and the controller. Data transceiver 116 connects to a communication port on the controller to allow two-way communication with an external host computer.

Figure 7:
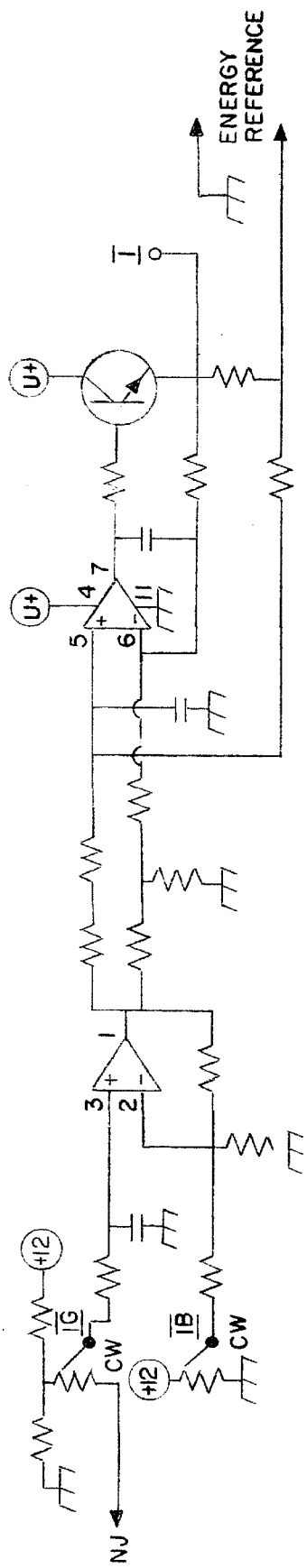
FIG. 7 is a circuit diagram of the profile generator forming a part of the controller of the present invention.

FIG. 7 illustrates a circuit diagram of one channel of four channel profile generator 42. The profile generator receives a pulse-width-modulated signal from CPU 38 whose duty cycle represents the reference for the energy output value of the particular one-of-four heating elements. The profile generator circuitry converts that signal into a 4–20 milliampere analog reference signal suitable for transporting noise-immune and. transmission-line-length-independent over a pair of wires to its phase angle driver 44 which may be remotely mounted near the actual radiant heater if remote control is desired.

Figure 8:
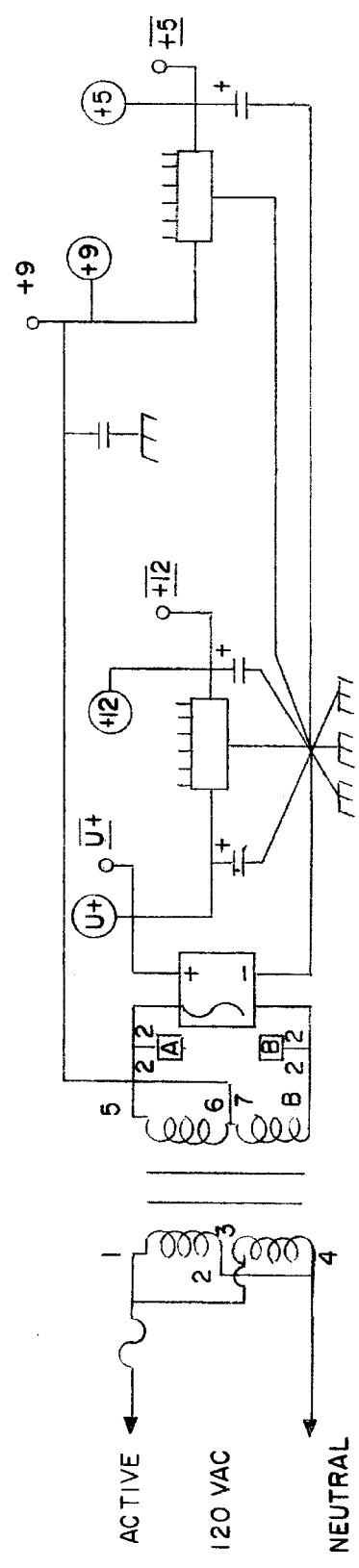
FIG. 8 is a circuit diagram of the power source for the present invention.

FIG. 8 is a circuit diagram of the power source of the present invention. The power source is a conventional transformer-isolated full-wave regulated configuration and provides low voltage for all circuitry except heating elements 23.

Figure 9:
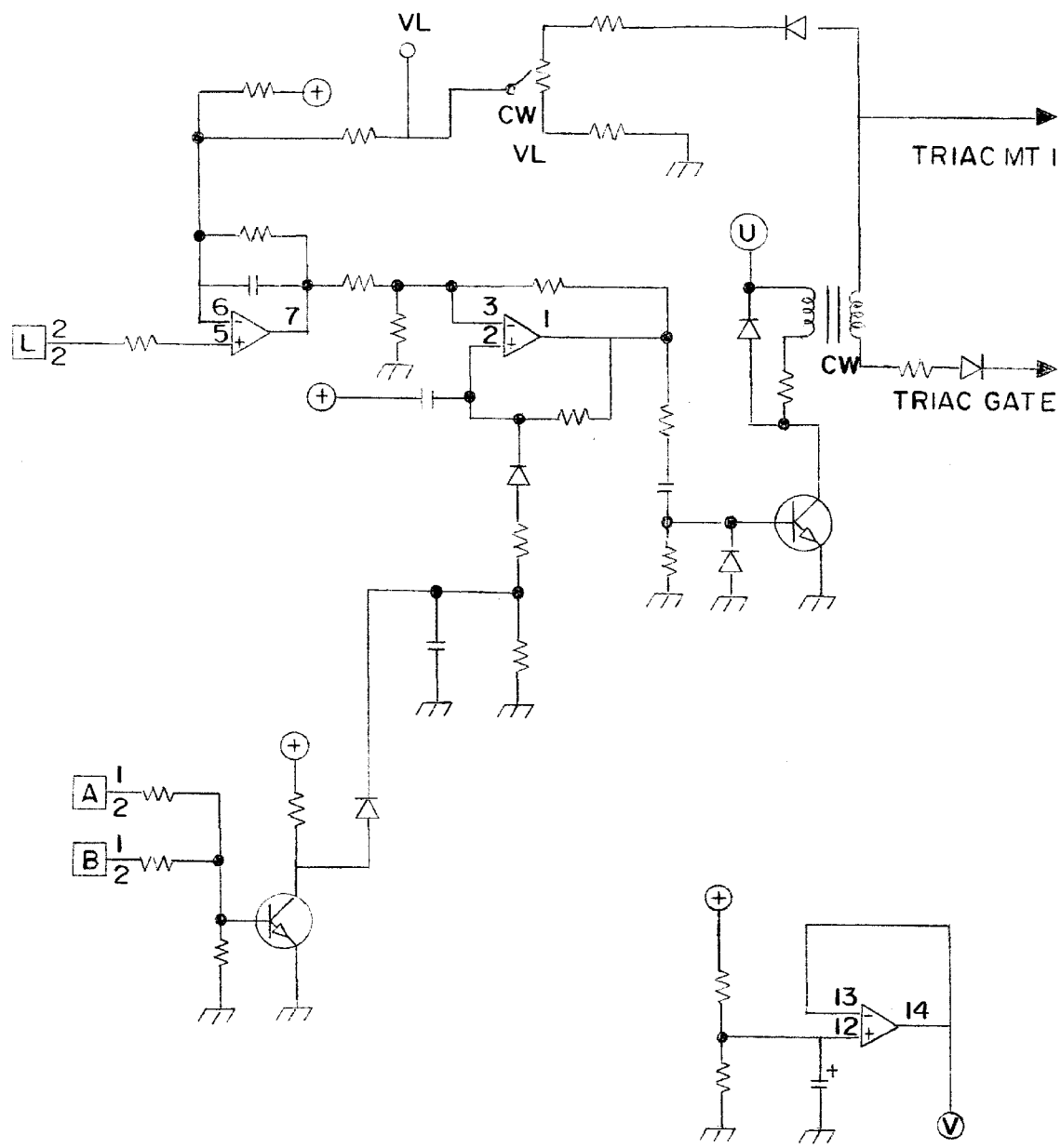
FIG. 9 is a circuit diagram of one phase angle driver channel of a total of four identical channels forming a part of the controller of the present invention.

FIG. 9 is a circuit diagram of one of four phase angle drivers 44 included in the present invention. Phase angler driver 44 accepts the analog reference from profile generator 42 and converts it into a pulse stream for triggering the power-switching thyristor 46. The pulse stream ceases upon zero-crossing of the input AC waveform and resumes after a period of time up to one one-hundred-and twentieth of a second after zero-crossing. The time delay is inversely proportional to the analog reference. If the reference is high, then the pulses resume soon after the zero crossing so that current is conducted from the power source to the heating element for most of the wave's half-cycle. This delivers maximum heat. Conversely, a low reference causes pulses to resume late in the half-cycle which delivers only small current flow and low heat. The heat is thus infinitely controllable between zero and one hundred percent output.

Although the invention has been described primarily for use in testing and examining laboratory samples, it may also be used in any environment in which precise heating or ingredient determination is required. It may thus be seen that the objects of the invention set forth, as well as those made apparent from the foregoing description, are efficiently attained. Although a preferred embodiment of the invention has been set forth for purposes of disclosure, modifications to the disclosed embodiment of the invention has been set forth for purposes of disclosure, modifications to the disclosed embodiment of the invention, as well as other embodiments thereof, may occur to those skilled in the art. Accordingly, the appended claims are intended to cover all embodiments of the invention and modifications to the disclosed embodiment which do not depart from the spirit and scope of the invention. It is, therefore, intended that the invention be limited only by the scope of the appended claims rather than by particular details of construction shown.

What is claimed is:

1. A controller for an electrically powered radiant heating element to deliver heat to a sample to be heated at a programmed rate until the programmed temperature is reached for programmed duration on a programmed schedule, the controller comprising: a power source; heating elements; signal receiving and transmitting means including means for selectively inputting signals to the signal receiving and transmitting means; a profile generator responsive to the signal receiving and transmitting means to control the application of heat energy to the heating elements and thus to the sample over a preselected period of time; phase angle drivers for receiving signals from the profile generator and converting the received signals to timing pulses; power switching means operable with the signal receiving and transmitting means and the profile generator to selectively deliver predetermined increments of power to the heating elements; and an energy sensor operable with the profile generator for determining the energy output of the heating elements and enabling the profile generator to control the application of heat energy to the heating elements to compensate for variations in input power.

2. The controller as claimed in claim 1 wherein the power switching means is responsive to the timing pulses received front the phase angle drivers to deliver selectively variable increments of power to the heating elements and the signal receiving and transmitting means is adapted to responsively vary the increments of power delivered to the heating elements at preselected intervals of time.

3. The controller as claimed in claim 1 wherein the signal receiving and transmitting means is a microprocessor and includes a keypad for entering the energy level, time intervals and temperature into the microprocessor.

4. The controller as claimed in claim 1 wherein the energy sensor is proximate the heating elements.

5. A radiant heater for analytical laboratory with precision energy control, non-contaminating exterior and uniform radiation footprint, the heater comprising: a base; a substantially vertical support member; a heater support fixture connected to the vertical member; heater means carried by the heater support fixture; a power source; and a controller afar the heater means, the controller receiving input pover from the power source and processing output power to the heater means to deliver heat to the sample at a programmed rate until a preselected temperature is reached for a preselected time interval within a programmed schedule wherein the controller comprises signal receiving and transmitting means including means for selectively inputting signals to the signal receiving and transmitting means, a profile generator responsive to the signal receiving and transmitting means to control the application of heat energy to the heating elements and thus to the sample over a preselected period of time, phase angle drivers for receiving signals from the profile generator and converting the received signals to timing pulses, power switching means operable with the signal receiving and transmitting means and the profile generator to selectively deliver predetermined increments of power to the heating elements, and an energy sensor operable with the profile generator for determining the energy output of the heating elements and enabling the profile generator to compensate for variations in input voltage and heating element efficiency.

* * * * *